(12) United States Patent
Powell et al.

(10) Patent No.: US 8,300,804 B2
(45) Date of Patent: *Oct. 30, 2012

(54) COMMUNICATION INSTRUMENT MOUNTING APPARATUS

(75) Inventors: Stephen Forrest Powell, San Antonio, TX (US); Gregory Edward Berger, San Antonio, TX (US); Nicholas Gibson Burgell, San Antonio, TX (US); Michael Edward Searcy, Schertz, TX (US)

(73) Assignee: Arminius Select Services Corporation, San Antonio, TX (US)

( * ) Notice: Subject to any disclaimer, the term of this patent is extended or adjusted under 35 U.S.C. 154(b) by 594 days.

This patent is subject to a terminal disclaimer.

(21) Appl. No.: 12/549,567

(22) Filed: Aug. 28, 2009

(65) Prior Publication Data

US 2010/0012803 A1    Jan. 21, 2010

Related U.S. Application Data

(63) Continuation-in-part of application No. 11/260,969, filed on Oct. 28, 2005, now Pat. No. 7,583,799.

(51) Int. Cl.
*H04M 1/00* (2006.01)
(52) U.S. Cl. ........................................ 379/454; 379/446

(58) Field of Classification Search .................. 379/443, 379/446, 447, 454, 455; 248/220.21, 224.7, 248/906
See application file for complete search history.

(56) References Cited

U.S. PATENT DOCUMENTS

4,152,874 A    5/1979    Ertl
4,602,755 A    7/1986    Rosten

*Primary Examiner* — Tuan Nguyen
(74) *Attorney, Agent, or Firm* — Jackson Walker, LLP (57) ABSTRACT

The present invention provides a communication instrument mounting apparatus comprising a mounting bracket having one or more mounting members shaped to engage the rear portion of a communication instrument. The mounting bracket of the present invention provides mounting sleeves for receiving mounting members. Such sleeves may be utilized to releasably attach the mounting bracket of the present invention directly to a mounting surface and/or a conventional input junction box. The mounting member of the present invention provides walls defining at least one cavity through which input cables may be inserted. In one embodiment, the cavity of the present invention has a generally rectangular configuration and is positioned upon the mounting bracket so as to be adjacent to one or more attachment ports of the instrument. The relative positioning of the cavity allows cables to be connected and/or disconnected in a convenient manner.

20 Claims, 7 Drawing Sheets

COMMUNICATION INSTRUMENT MOUNTING APPARATUS

This application is a continuation-in-part application claiming priority to U.S. patent application Ser. No. 11/260,969, filed Oct. 28, 2005, now U.S. Pat. No. 7,583,799, issued Sep. 1, 2009.

FIELD OF THE INVENTION

The present invention relates generally to mounting brackets and, more particularly, to a mounting bracket for mounting to a mounting surface an electric signal generator; data or voice communication device including, but not limited to, an Internet Protocol (IP) telephone; an internet router; and like devices.

BACKGROUND OF THE INVENTION

For a century, conventional telephone systems have been utilized to make telephone calls. When a conventional telephone call is made, a circuit opens between the two parties. No matter how long the parties speak, or whether there are quiet periods in the conversation, the circuit remains open. The greater the distance between the parties, the greater the cost because telephone companies must lease a longer telephone line for that call to take place.

Currently communication instruments include electric signal generators, voice and data devices, internet routers, and the like. These communication devices need to be mounted on walls and other support surfaces to make them accessible to users.

Voice over Internet Protocol, commonly called Voice over IP or VOIP, utilizes the Internet to deliver voice communications. A VOIP phone converts audio information into "packets" and transmits those packets using the same technology that a computer uses to download web pages and e-mail. Basically, a VOIP phone is an Internet computer that looks and behaves like a very powerful phone. The use of VOIP phones is becoming more prevalent, there remains a need for a convenient and effective method of mounting such telephones and the various other communication instruments described above to a variety of mounting surfaces.

SUMMARY OF THE INVENTION

Accordingly, the present invention provides a communication instrument mounting apparatus comprising a mounting bracket or plate having a front surface containing at least one mounting member or peg. In one embodiment, the mounting members of the present invention extend outwardly from the front surface of the mounting bracket and are shaped to engage the rear portion of an instrument to be releasably mounted thereto. In other embodiments, the peg is an integrally molded "button-like" protrusion extending outwardly from the bracket face surface. In yet other embodiments where the mounting bracket is metal, the peg may be a rivet-like protrusion which is stamped into a sleeve in the bracket. In further yet other embodiments, the mounting member secures or fastens the bracket to the mounting surface and further provides a distal end for mounting the instrument.

The mounting bracket of the present invention provides at least one hollow cylindrical bore mounting sleeve for receiving a mounting fastener or screw. In one embodiment, at least one sleeve is an elongated slot bore. In yet another embodiment, at least one sleeve is a "pear-shaped" bore to allow a fastener or mounting member to slide within the bore until tightened to secure the position of the bracket on the mounting surface. Such sleeves may be utilized to releasably attach the mounting bracket of the present invention directly to a mounting surface such as a wall and/or a conventional electrical box. In some embodiments, the fastener not only attaches the bracket to the mounting surface, but also extends sufficiently beyond the bracket face to attach the communication instrument to the bracket.

The mounting bracket of the present invention provides walls defining at least one cavity through which communication hookups may be passed. In one embodiment, such a cavity has a generally rectangular configuration and is positioned so as to be adjacent to one or more attachment ports of the instrument to be mounted. For example, if the user wishes to mount an IP telephone, he or she will be required to connect data and power cables to the instrument in order to facilitate its operation. The relative positioning of the cavity provided by the present invention allows such operation cables to be connected and/or disconnected in a convenient manner. In yet another embodiment, the cavity is provided with a mounting notch which cooperates with a mounting screw or fastener in the mounting surface (wall, a service box or electrical junction box) to secure the bracket to the mounting surface.

As previously indicated in one embodiment, the mounting pegs or lugs of the present invention are removable from the mounting bracket and in some cases serve as fasteners to secure the bracket to the mounting surface and serve as a mounting peg or lug for the instrument. In this embodiment, threaded proximate ends of each removable mounting peg are designed for insertion into mounting member sleeves provided in the mounting bracket. Each mounting member sleeve is selectively positioned upon the front surface of the mounting bracket so as to align with OEM sleeves or mounting receptacles provided upon the rear portion of the communication instrument.

The distal end of each removable mounting peg may be shaped and sized to engage mounting receptacles provided by a wide variety of instruments. Thus, the user may insert mounting members selected from a variety of styles into corresponding mounting member sleeves provided upon the front surface of the mounting bracket to accommodate mounting of any number of particular instruments. This feature of the present invention allows the user to adapt the mounting bracket to accommodate a plurality of instrument designs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 6:
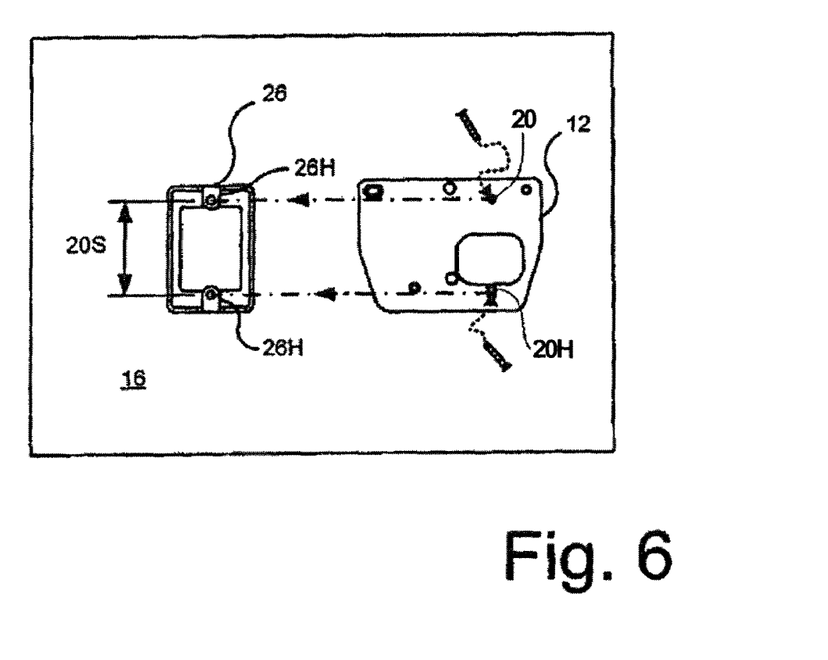
FIG. 6 is an exploded view illustrating the attachment of one embodiment of the present invention mounting bracket to an input junction box on a wall.
Figure 6A:
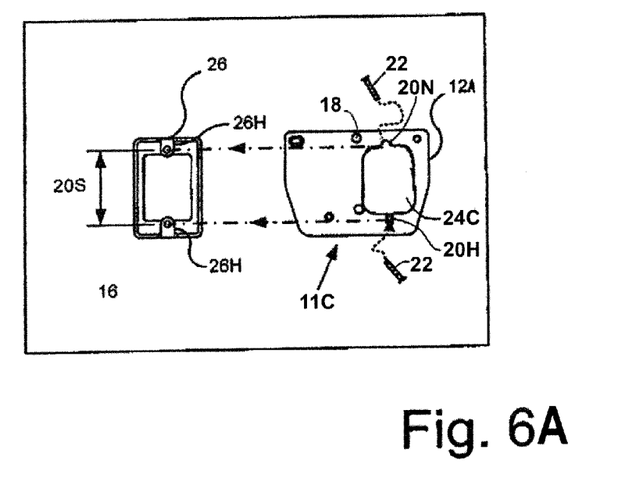
FIG. 6A is an exploded view illustrating the attachment of another embodiment of the present invention mounting bracket to an input junction box on a wall.
Figure 7:
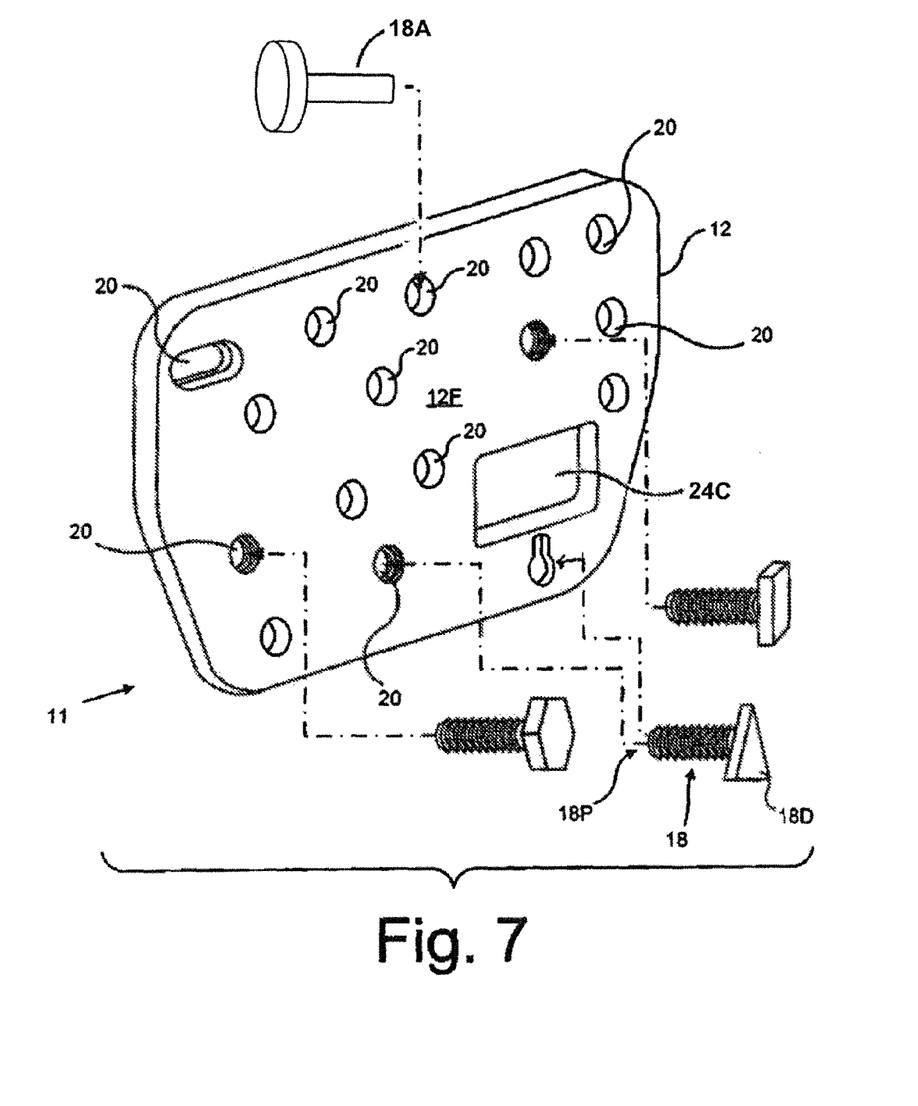
FIG. 7 is a perspective view of the instrument mounting kit of one embodiment of the present invention.
Figure 7A:
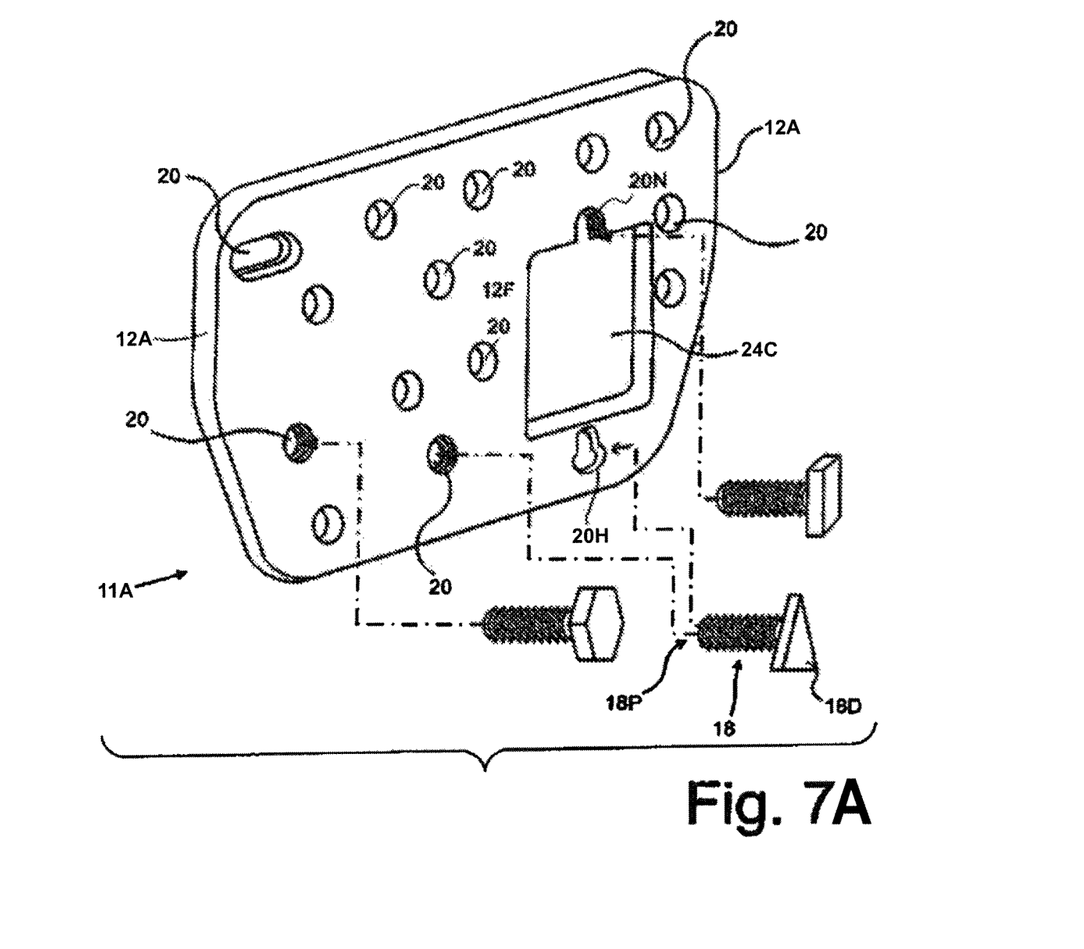
FIG. 7A is a perspective view of the mounting kit of an embodiment with a mounting notch in the cavity of the bracket of the present invention.
Figure 7B:
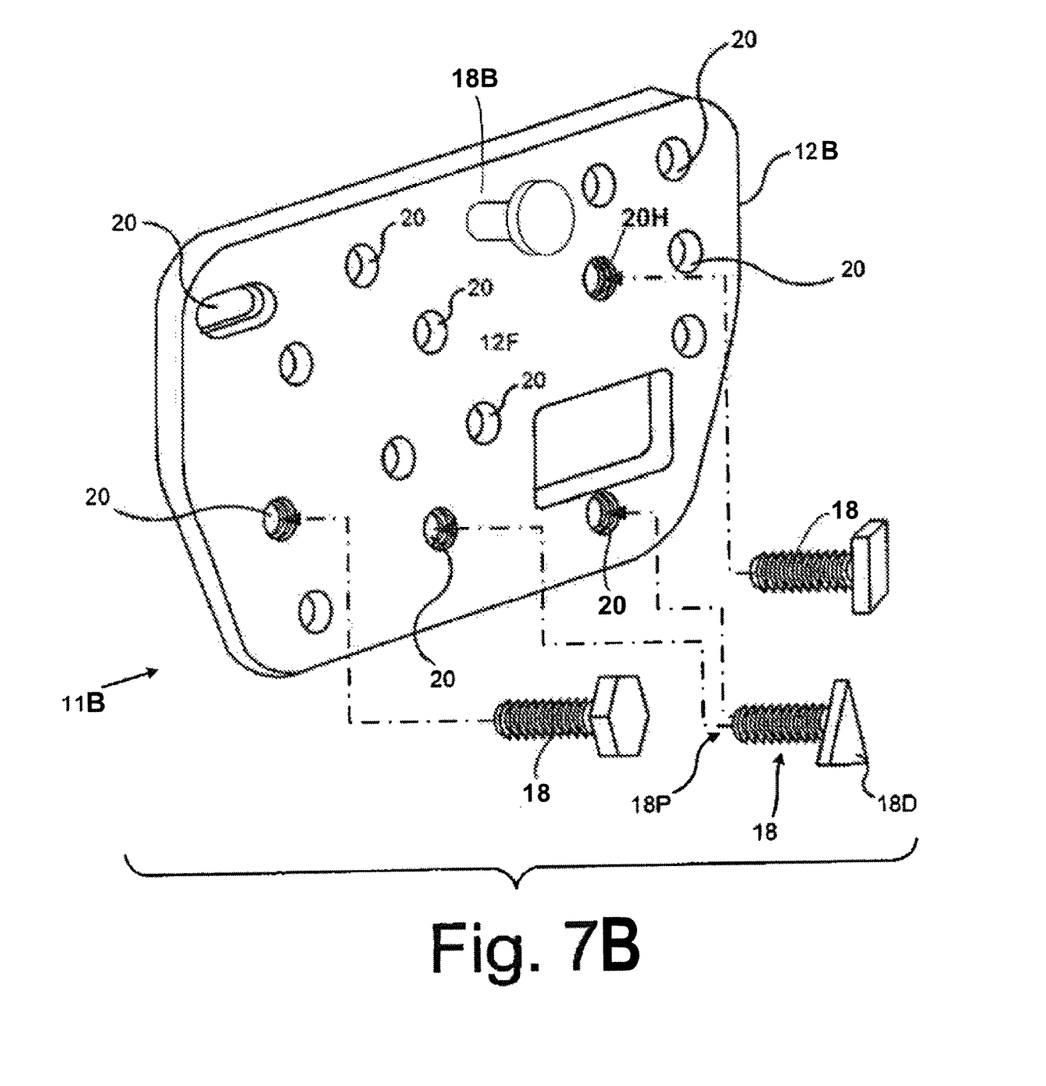
FIG. 7B is a perspective view of the mounting kit of an embodiment with a proximate end of a mounting member molded to the bracket of the present invention.
Figure 7C:
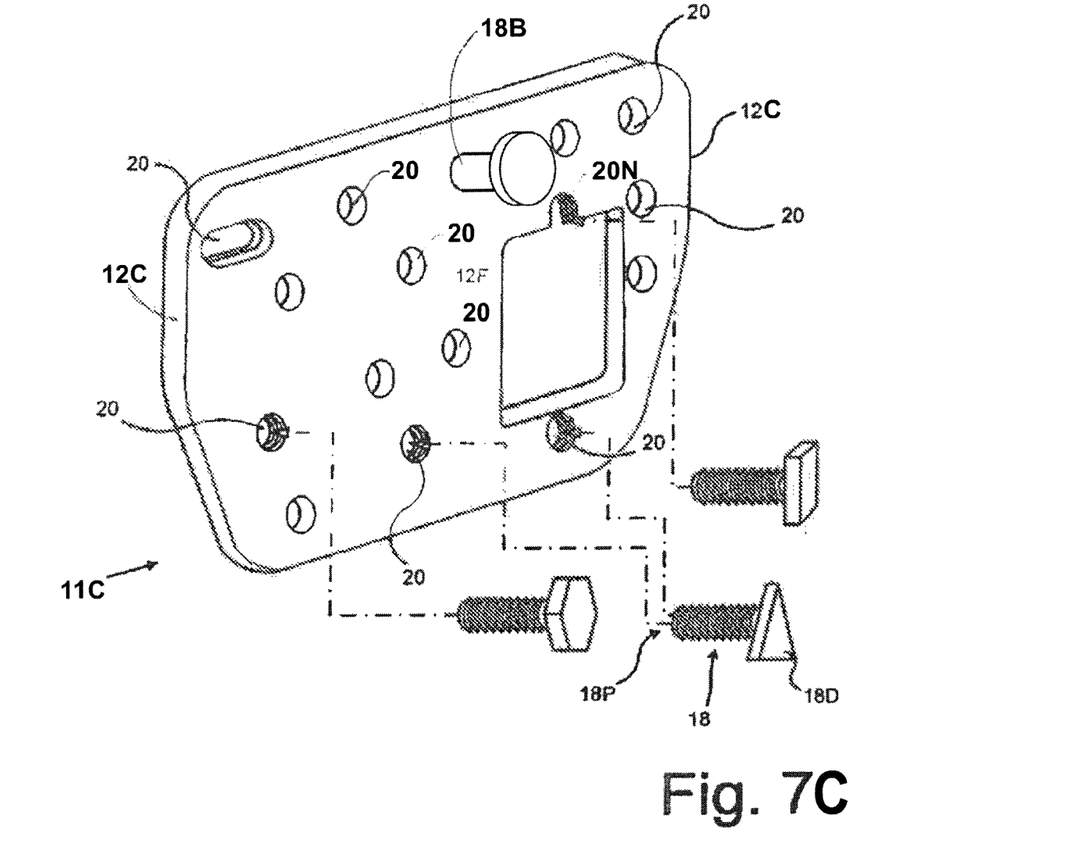
FIG. 7C is a perspective view of the mounting kit of an embodiment with a mounting notch and a mounting member molded to the bracket of the present invention.

The present invention is herein described as a telephone mounting apparatus (10) and as a mounting kit (11-11C) (FIGS. 7-7C). Referring to FIGS. 1-6, the present invention comprises a mounting bracket (12) having a front surface or face (12F) and a rear surface or face (12R) for engaging a mounting surface (16) or wall (FIGS. 6 and 6A). The mounting bracket of the present invention may be composed of any suitable material as would be apparent to one of ordinary skill in the art. In one embodiment, the mounting bracket of the present invention is composed of molded plastic.

In one embodiment, the mounting bracket (12) of the present invention is designed to releasably attach to a wall or other mounting surface (16) already provided with an input junction box (26) carrying input electrical, data, voice, and like communications input. In this manner, the mounting bracket of the present invention allows, for example, for the quick and convenient upgrade from a conventional telephone arrangement to an IP telephone arrangement, as discussed further below.

The mounting bracket (12) is equipped with at least one mounting member or peg (18). These members may be threaded, unthreaded (press fit), integrally molded or stamped rivets. In one embodiment, the mounting members of the present invention extend outwardly from the front surface (12F) of the mounting bracket (12) and are shaped to engage the rear portion (14R) of a communications instrument (14), such as a telephone. It being understood that the mounting members (18) may be shaped and/or sized to accommodate any number of instruments (14) as well as any number of mounting surfaces (16).

Figures 1, 3:
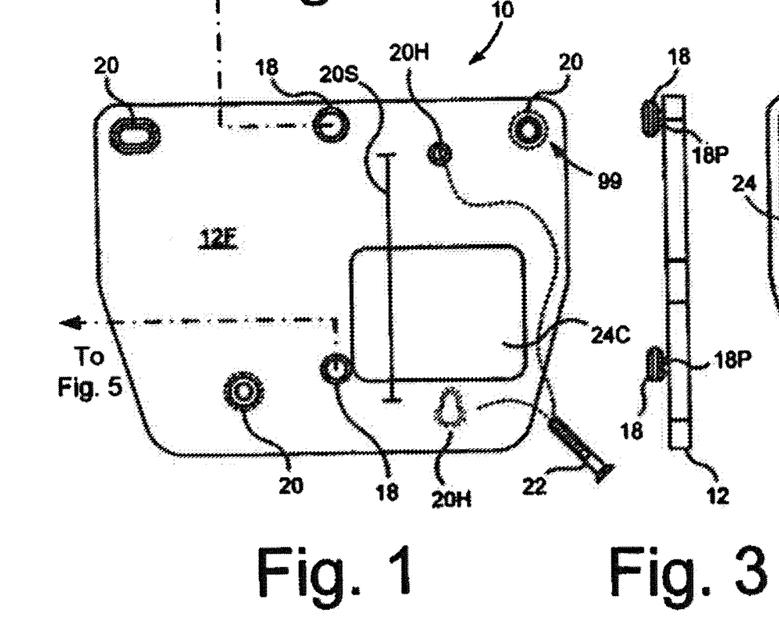
FIG. 1 is a front, elevation view of the mounting bracket of one embodiment of the present invention.
FIG. 3 is a right side, elevation view of the mounting bracket of the FIG. 1 embodiment of the present invention.
Figure 4:
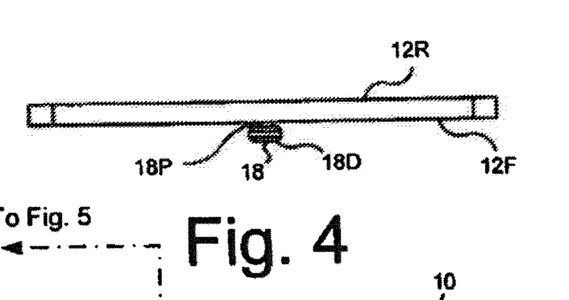
FIG. 4 is a top plan view of the mounting bracket of one embodiment of the present invention.
Figure 5:
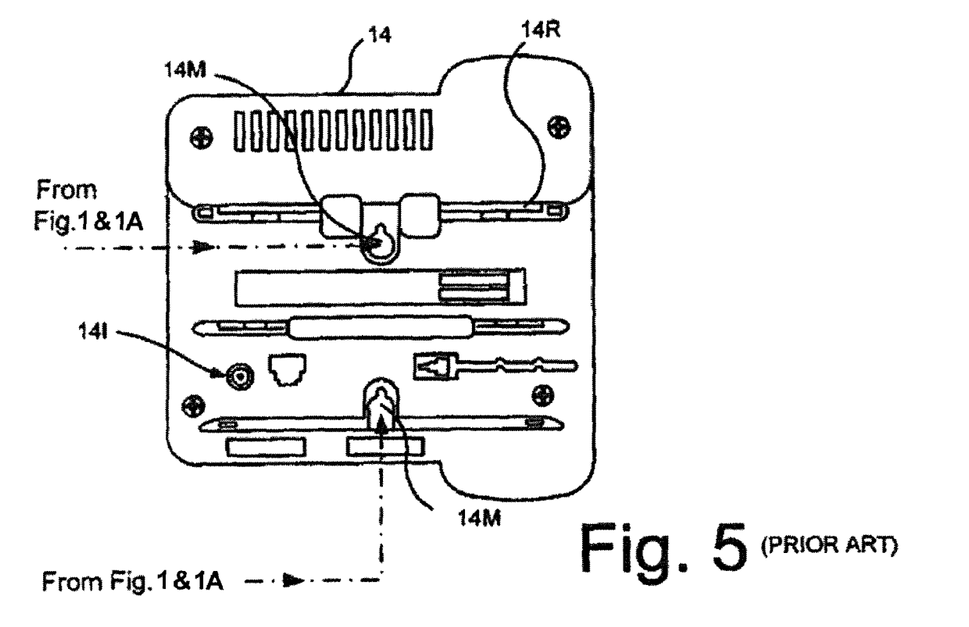
FIG. 5 is an elevation view of the rear portion of a prior art IP telephone.

As may be seen in FIGS. 3 and 4, each mounting member (18) of the present invention has a proximate end (18P) affixed to the front surface (12F) of the mounting bracket (12) and a distal end (18D) spaced apart from the front surface and shaped to engage a rear portion (14R) of the instrument (14). It should be understood that a mounting member 18 may be releasably affixed, integrally molded (FIGS. 7B and 7C) or stamped to the front surface. The distal end of the mounting members 18 may have a rounded, generally circular configuration similar to a thick button to facilitate engagement with OEM sleeves or mounting receptacles (14M) provided upon a rear portion of the instrument (see FIG. 7).

The mounting bracket (12) of the present invention may provide at least one mounting orifice or sleeve (20) having a bore (20H) or a mounting notch (20N) for receiving a screw or fastener member (22). Such orifices or sleeves may be utilized to releasably attach the mounting bracket (12) directly to a mounting surface (16), whether or not an input junction box (26) is present. FIGS. 1, 1A, 2, 2A, 7, and 7A illustrate a sleeve with a "pear-shaped" bore (20H) to allow a fastener (22) or mounting member (18) to slide within the bore until tightened to secure the position of the bracket on the mounting surface. FIGS. 7B and 7C illustrate a generally circular bore (20) for the sleeve.

The present invention provides mounting sleeves (20) capable of mounting the bracket of the present invention to a wall and/or input junction box, as directed by the user. A plurality of mounting sleeves, in any number of sizes, may be provided by the present invention for this purpose. Further, additional mounting sleeves may be positioned upon the mounting bracket in any number of configurations to allow for the selective attachment of mounting members (18) to secure an instrument to the bracket.

Where desired the user may urge the proximate end of a mounting member (18) into and through a mounting sleeve (20) to secure the bracket (12) to the surface (26) while the distal end of the mounting member extends beyond and is spaced apart from the front surface of the bracket. This enables an instrument to be attached to the distal end of the mounting member thereby engaging and securing the instrument to the bracket. In one embodiment, at least one mounting sleeve is positioned proximately to a corner (99) of the mounting bracket. This feature of the present invention allows the mounting bracket to be securely attached to a mounting surface.

The present invention provides edges (24) defining at least one cavity (24C) through which instrument hookups may be inserted. In one embodiment, the cavity (24C) of the present invention has a generally rectangular configuration and is positioned within the mounting bracket so as to align and cooperate with one or more jack attachment ports (141) of the instrument. For example, if the user wishes to mount an IP telephone, he or she will be required to connect external data wiring and power cables to port (141) in order to facilitate its operation. The relative positioning of the cavity (24C) of the present invention allows such cables pass through the bracket (12) to be connected and/or disconnected in a convenient manner.

Figure 1A:
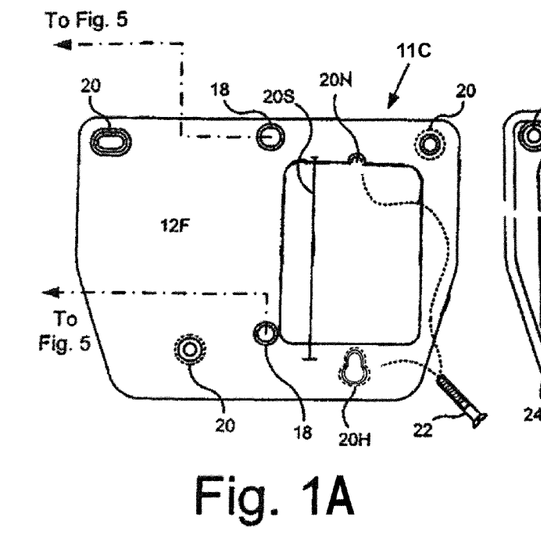
FIG. 1A is a front, elevation view of the mounting bracket of another embodiment of the present invention.
Figure 2:
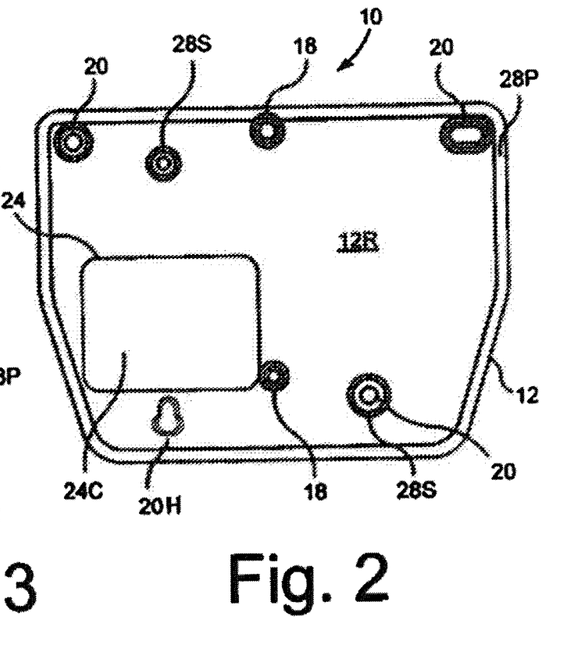
FIG. 2 is a rear, elevation view of the mounting bracket of the embodiment of FIG. 1.
Figure 2A:
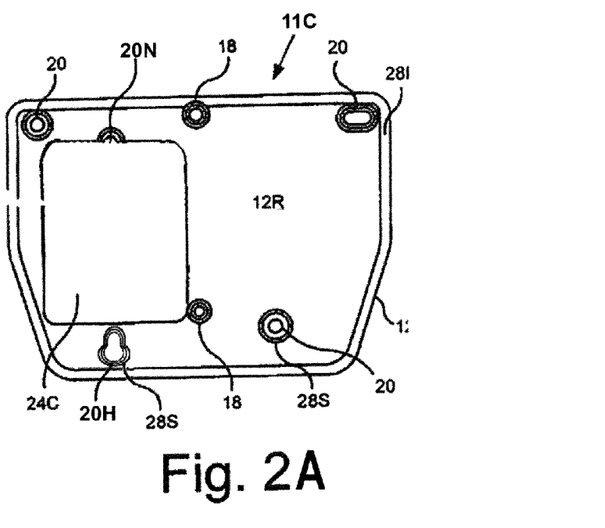
FIG. 2A is a rear, elevation view of the mounting bracket of another embodiment of FIG. 1A.

FIGS. 1A, 2A, and 6A illustrate an embodiment (11A) wherein the cavity (24C) is elongated to conform to the bolting configuration of an input junction box. A mounting notch (20N) in the cavity (24C) allows the bracket to be secured by a fastener (22) to an input junction box or directly to a wall.

In one embodiment (see FIGS. 1, 2, and 6), the present invention provides two mounting orifices (20 and 20H) having a relative spacing (20S) therebetween to facilitate screw insertion through each orifice and into screw holes (26H) provided in a conventional input junction box (26) (FIG. 6). Such mounting orifices may be positioned upon the mounting bracket (12) adjacent to the cavity (24C) and, in particular, above and below the cavity. This feature of the present invention allows the mounting bracket to mount to any conventional receptacle box (26) while also allowing for the efficient hook up of input data and power cables through the cavity (24C). It should be understood that the "pear-shaped" orifice (20H) enables the user to slip the bracket over the head of the fastener (22) or mounting member (18) and adjust the location of the bracket on the surface (26) by sliding the bracket along the neck of the fastener or mounting member until the bracket is in a proper position. The fastener or mounting member may be tightened to hold the bracket in place.

The mounting bracket of the present invention is designed to flush mount to a wall or other linear mounting surface. To facilitate flush mounting, each mounting sleeve of the present invention may be equipped with a raised lip or edge (28S) extending outwardly from the rear surface (12R) of the mounting bracket (12). Further, the entire periphery of the mounting bracket may also be equipped with a raised surface or lip (28P) extending outwardly from the rear surface of the mounting bracket. In one embodiment, each raised surface (28S and 28P, respectively) extends about ⅜ of an inch from the rear surface (12R) of the mounting bracket. to ensure even mounting upon linear surfaces.

Referring to FIGS. 7-7C, in one embodiment, the mounting members or pegs (18) of the present invention are shown in various arrangements. Some of the mounting members are integrally molded to the bracket face and others are removable from the mounting bracket and may be provided to the user along with the mounting bracket in the form of a mounting kit. In these embodiments, the proximate ends (18P) of each mounting peg (18) are designed to be disposed on the front surface (12F) of the mounting bracket (12). As may be seen in FIG. 7, a plurality of sleeves (20) may be provided in the bracket to accommodate the variety of configurations of the rear surfaces (14R) of the communications instrument. Mounting member sleeves may be selectively positioned upon the front surface of the mounting bracket so as to align with OEM sleeves or mounting receptacles (14M) provided upon the rear portion (14R) of the instrument (14) to be mounted.

Again it should be understood that some mounting pegs may be threaded and allow for the peg to be positioned on the front face, pass therethrough, and fasten the bracket to the wall while still providing a distal end as a means for attachment to the rear of the instrument.

The distal end (18D) of the mounting member may be shaped and sized to engage the mounting receptacles (14M) provided upon the rear portion (14R) of any number of instruments to be mounted. In this embodiment, the user may insert selected mounting members into corresponding mounting member sleeves provided upon the front surface of the mounting bracket to accommodate efficient and convenient instrument mounting. This feature of the present invention allows the user to adapt the mounting bracket to accommodate a plurality of instrument designs.

FIG. 7A illustrates a kit (11A) wherein the bracket (12A) is provided with a cavity (24C) which has a mounting notch (20N) for mounting the bracket (12) to a conventional input junction box as described above.

FIG. 7B shows a perspective view of a kit (11B) wherein at least one mounting member (18B) is integrally formed in the bracket (12B). The member may be molded as part of the bracket, sonic or heat welded to the bracket; or in some embodiments, stamped as a rivet to the front face of the bracket. It should be understood that other mounting members (18) may not only be adapted to mount an instrument on the bracket (12), but also be adapted to fasten the bracket (12) to the surface (26) by extending through sleeves (20) and engaging with the surface (26).

FIG. 7C illustrates a kit (11C) having a bracket (12C) with both an integrally formed mounting member (18B) and a mounting notch (20N).

In these kits (11-11C), the user simply picks which mounting member to attach to the mounting bracket and inserts it into the mounting bracket using the appropriate mounting member orifice or sleeve. Once secured, the distal end of the mounting member(s) may be inserted into the mounting receptacle provided upon the rear portion of the instrument. Any number of ways may be utilized to attach the pegs (18) to the bracket (12) such as interference fit, adhesive, sonic welding, threads, and the like.

The mounting member sleeves and mounting members may also be color coded to assist the user in selecting the appropriate sleeve and mounting member for use in mounting a particular instrument. Further, portions of the mounting member sleeves and mounting members may be threaded to allow the user to simply screw the mounting member into the appropriate mounting member sleeve. It should be understood that the mounting members of the present invention may be used independently from, or in conjunction with, conventional screws, and that conventional screws may also be provided to the user in the mounting kit for securing the brackets to various support surfaces (26).

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A mounting apparatus for use with an instrument having external communication wiring and attachment ports comprising:
   a mounting bracket having a front surface for engaging a rear portion of said instrument and a rear surface for engaging a mounting surface;
   at least one first mounting member extending outwardly from said front surface of said bracket, said first mounting member having a proximate end positioned at said bracket front surface and a distal end spaced apart from said bracket front surface for engaging a rear portion of said instrument;
   at least one mounting sleeve in said mounting bracket, said sleeve having a portion for receiving a second mounting member; and
   at least one cavity in said bracket for allowing said communication wiring to pass therethrough,
   wherein a proximate end of said second mounting member is arranged inside said mounting sleeve.

2. The mounting apparatus of claim 1, wherein said at least one cavity has a mounting notch for receiving a fastener for securing said mounting bracket to said mounting surface.

3. The mounting apparatus of claim 1, wherein said proximate end of said at least one mounting member extending outwardly from said front surface of said bracket is integrally formed in said bracket front surface.

4. The mounting apparatus of claim 2, wherein said proximate end of said at least one mounting member extending outwardly from said front surface of said bracket is integrally formed in said bracket front surface.

5. The apparatus of claim 1, wherein said mounting bracket comprises at least two mounting sleeves, said mounting sleeves being spaced apart to facilitate fastener insertion therethrough and into attachment holes provided by a conventional input junction box.

6. The apparatus of claim 1, wherein at least one of said mounting sleeves is adjacent to said cavity.

7. The apparatus of claim 1, wherein said mounting sleeves extend outwardly from said front surface of said mounting bracket.

8. The apparatus of claim 1, wherein said cavity is adjacent to one or more said attachment ports of said instrument upon mounting of said instrument to said bracket.

9. The apparatus of claim 1, wherein said mounting bracket is composed of molded plastic.

10. The apparatus of claim 1, wherein said rear surface of said mounting bracket comprises at least one raised surface to facilitate even mounting of said bracket to said mounting surface.

11. The apparatus of claim 1, wherein said mounting bracket is metal and said first mounting member is stamped to said bracket front surface.

12. The apparatus of claim 1, wherein said first mounting member is removably attached to said mounting bracket.

13. A mounting apparatus for use with an instrument having external communication wiring and attachment ports comprising:
- a mounting bracket having a front surface for engaging a rear portion of said instrument and a rear surface for engaging a mounting surface;
- at least two mounting members extending outwardly from said front surface of said bracket, each of said mounting members having a proximate end positioned on said bracket front surface and a distal end spaced apart from said bracket front surface for engaging a rear portion of said instrument, said distal end of said mounting members being shaped to engage mounting receptacles upon a rear portion of said instrument;
- a plurality of mounting sleeves for receiving a proximate end of a third mounting member; and
- walls defining at least one cavity having a generally rectangular configuration, said cavity located adjacent to one or more attachment ports of said instrument upon mounting of said instrument to said bracket.

14. A mounting kit comprising:
- a mounting bracket comprising a plurality of mounting sleeves, said sleeves being selectively positioned upon said mounting bracket so as to align with one or more instrument mounting receptacles; and
- a plurality of mounting members, each having a proximate end sized for insertion into at least one of said mounting member sleeves and a distal end sized to releasably engage at least one of said instrument mounting receptacles,
- wherein said proximate end of said mounting member is arranged inside said mounting sleeve.

15. The mounting kit of claim 14, wherein said mounting sleeves and said mounting members are color coded.

16. The mounting kit of claim 14, wherein at least a portion of said mounting sleeves are threaded.

17. The mounting kit of claim 16, wherein at least a portion of said mounting members are threaded.

18. The mounting kit of claim 14, wherein said mounting bracket further comprises walls defining a cavity.

19. The mounting kit of claim 13, wherein said cavity has a generally rectangular configuration.

20. The mounting kit of claim 18, wherein said cavity has a mounting notch for receiving a fastener for securing said mounting bracket to said mounting surface.

* * * * *